(12) United States Patent
Lahr

(10) Patent No.: US 7,631,638 B2
(45) Date of Patent: Dec. 15, 2009

(54) IMITATION BLOWER/SUPERCHARGER/FUEL INJECTION WITH REALISTIC SOUND

(76) Inventor: Ronnie Wayne Lahr, 13571 St Rt 120 East, Slaughters, KY (US) 42456

( * ) Notice: Subject to any disclaimer, the term of this patent is extended or adjusted under 35 U.S.C. 154(b) by 0 days.

(21) Appl. No.: 11/625,401

(22) Filed: Jan. 22, 2007

(65) Prior Publication Data

US 2008/0174135 A1 Jul. 24, 2008

(51) Int. Cl.
*F02B 33/00* (2006.01)
(52) U.S. Cl. .............................. 123/559.1; 123/65 BA
(58) Field of Classification Search ... 123/559.1–559.3, 123/563–565; 418/203, 206.6
See application file for complete search history.

(56) References Cited

U.S. PATENT DOCUMENTS

| | | | | |
|---|---|---|---|---|
| 1,878,210 A | * | 9/1932 | Vincent | 123/559.3 |
| 2,359,219 A | * | 9/1944 | Jones | 123/527 |
| 2,398,094 A | * | 4/1946 | Heymann | 123/550 |
| 2,551,307 A | * | 5/1951 | Yingling | 123/563 |
| 2,654,530 A | * | 10/1953 | Oldberg | 418/203 |
| 2,896,598 A | * | 7/1959 | Reggio | 123/563 |
| 4,350,135 A | * | 9/1982 | Casey et al. | 123/564 |
| 4,401,060 A | * | 8/1983 | Goodman | 123/25 R |
| 4,453,524 A | * | 6/1984 | Lee | 123/565 |
| 4,610,326 A | * | 9/1986 | Kirchweger et al. | 180/68.1 |
| 4,813,857 A | * | 3/1989 | Kawakami | 418/206.6 |
| 5,140,816 A | * | 8/1992 | Scicluna | 123/559.1 |
| 5,263,463 A | * | 11/1993 | Perry | 123/559.1 |
| 5,460,145 A | * | 10/1995 | Perry, Jr. | 123/559.1 |
| 5,908,013 A | * | 6/1999 | Dyess | 123/65 BA |
| 6,012,436 A | * | 1/2000 | Boutcher | 123/559.1 |
| 6,105,558 A | * | 8/2000 | Bushling | 123/559.1 |
| 7,107,962 B1 | * | 9/2006 | Spies et al. | 123/198 E |
| 2006/0169256 A1 | * | 8/2006 | Lavender et al. | 123/559.1 |
| 2008/0060623 A1 | * | 3/2008 | Prior | 123/559.1 |

* cited by examiner

*Primary Examiner*—Thai Ba Trieu
(74) *Attorney, Agent, or Firm*—David W. Barman; Robert M. Schwartz

(57) ABSTRACT

An imitation supercharger blower assembly for a vehicle is provided that will produce a look and sound similar to a functional supercharger blower assembly.

11 Claims, 3 Drawing Sheets

IMITATION BLOWER/SUPERCHARGER/FUEL INJECTION WITH REALISTIC SOUND

BACKGROUND OF THE INVENTION

Automobile enthusiasts enjoy working on their automobiles to enhance the look or performance thereof. Supercharging a motor vehicle is a typical way that one can enhance the performance of an internal combustion engine of a motor vehicle. A supercharger, similar to a turbo charger, increases the amount of air being injected into the cylinders of the internal combustion engine. Along with the increased air, increased fuel consumption can occur with the increased amounts of air present in the cylinders. The resulting effect for the same internal combustion engine, produces a higher output than it was designed to do without the super charging of the air prior to the injection of the fuel and air into the cylinders of the internal combustion engine.

A supercharger utilizes the power generated by the internal combustion engine to power a blower to force more air into the internal combustion engine. Conversely, a turbo charger receives its power from the stream of exhaust fumes exiting the motor vehicle through the exhaust manifold. Regardless of where the added units obtain their power to charge the air coming into the internal combustion engine, both enhance performance by increasing the amount of air entering the internal combustion engine for combustion of fuel.

A supercharger typically is mounted on top of the internal combustion engine because that is where the air enters the cylinders via an inlet port found typically near the front of the motor vehicle. By placing a supercharger on top of an internal combustion engine, and introducing increased air into the combustion chamber, the overall profile of the internal combustion engine by having an blower/supercharger visible on the outside of the engine hood.

Typically, the hood of a motor vehicle is cut such that an air scoop extends above the upper surface of the hood. This protruding air scoop further creates an aesthetic look that is appealing to those who wish to supercharge a motor vehicle.

On problem arises in that superchargers are very costly. Many enthusiasts would desire the look and sound of the supercharger without the cost.

Additional difficulties in installing a functional blower supercharger are that the functional assembly requires precise installation placement and tolerances must be within 0.003 of an inch. The imitation assembly is easier to install because there are no rotors that need to be timed or clearanced.

The functional assembly is restricted on based on camshaft duration. Prolonged duration allows excess air in the combustion chamber and significantly increases the chance of damaging (i.e. "blowing") an engine. The non-functional assembly allows a user to run a camshaft with any duration as desired.

The functional assemblies that have fuel injection that require high pressure fuel pump with 60-90 psi fuel pressure that runs off the timing chain. It has to be manually primed with fuel before a user can start the engine. The non-functioning assembly of the present invention allows for use of a standard fuel pump, mechanical or electric, with 7 psi of fuel pressure. It does not require priming before starting the engine.

The present invention addresses the need for aesthetics without a prohibitive cost and without the added power to the engine.

BRIEF SUMMARY OF THE INVENTION

The present invention relates to a supercharger blower assembly that looks and sounds like a functioning supercharger blower but, because it is non-functioning, does not have the same cost.

Functional supercharger blowers may produce sound of 50-80 decibels (db) measured 5 feet from the front of a vehicle and the sound output may depend on such parameters as the size of the pulleys, size of the gears, and speed at which the belt and gears are driven. The imitation supercharger blower of the present invention provides a similar drive belt, gears, and sound output as a functioning supercharger blower. Because the imitation supercharger blower does not actually interact with the air-fuel mixture entering the engine, it is not as difficult or expensive to produce, install, or operate. The reduced cost makes the supercharger blower assembly of the present invention desirable to persons wanting the look of a supercharger blower without the cost or additional power.

Further, functional supercharger blowers comprise rotors that force air into the combustion chamber to increase horsepower. These rotors are subject to physical and structural forces such that the stress from these forces are known to cause numerous incidents of injury and death from broken rotors.

Functional supercharger blowers are not fuel efficient, often requiring hand priming of the fuel injectors before use, are typically not compatible with OEM HEI (High Energy Ignition) distributors, thus requiring costly after market distributors in order to function, and are complex to install.

The conventional distributor cap has one post for each cylinder and in ignition systems with points, there is a central post for the coil voltage coming into the distributor. In HEI (High Energy Ignition) systems there is not a central post, the ignition coil sits on top of the distributor. On the inside of the cap there is a terminal that corresponds to each post and plug terminals are arranged around the circumference of the cap according to the firing order to send a secondary voltage to the proper spark plug at the right time.

The "rotor" head is attached to the top of the distributor shaft which is driven by a gear on the engine's camshaft and thus synchronized to it. This rotor is pressed against a carbon brush on the center terminal of the distributor cap which connects to the ignition coil either through the top and wired directly to the coil in HEI systems; or via the center terminal in a points ignition system and is remotely connected to the coil. The rotor is constructed such that the center tab is electrically connected to its outer edge so the voltage coming in to the center post will travel through the carbon point to the outer edge of the rotor. As the camshaft rotates, the rotor spins and its outer edge passes each of the internal plug terminals to fire each spark plug. Because the supercharger blower of the present invention does not perform a function other that aesthtics and sound, it may be configured to directly connect to an HEI distributor.

One embodiment of the present invention provides for an imitation supercharger blower assembly comprising;
 (a) An intake manifold;
 (b) An spacer for receiving attachment of said manifold to spacer;
 (c) A blower case configured for connectively receiving said manifold joined to said spacer;

(d) A bearing housing secured to one end of said blower case;

(e) A drive pulley attached to the exterior of said bearing housing;

(f) at least two gears positioned on the interior of said bearing housing, interacting with said drive pulley;

said gears are configured to be turned by connective interaction between an engine crankshaft pulley and said drive pulley.

The imitation supercharger blower assembly of the present invention has an adapter plate that attaches to a carburetor. Additionally, the rotors required in functional units are not present. This allows the imitation supercharger blower to be simpler to install and operate. Further, it allows the imitation supercharger blower assembly of the present invention to provide for an assembly that is configured to attach directly to an HEI distributor 70 without the need of after market distributors. This makes installation of the imitation assembly easier because functional assemblies require smaller diameter distributors in order to have the required clearance. The present invention provides for a blower/supercharger that extends through and above the hood of a vehicle, a blower case that provides an enclosure containing a bearing plate, and gears within the blower case. The turning of the gears produces a sound similar to a functioning blower. The imitation supercharger blower assembly of the present assembly further comprises non-functioning fuel components of fuel injector lines 50, fuel regulator, fuel pressure activator, and fuel block.

The present invention also provides a method for providing the look and sound of a supercharger blower assembly comprising the steps of:

(a) mounting an imitation supercharger blower assembly to the engine of a motor vehicle;

(b) attaching drive gears of said imitation supercharger blower assembly to a belt connected to crankshaft pulley of said motor vehicle;

(c) activating said imitation supercharger blower assembly by initiating engine ignition of said motor vehicle.

It is an object of the present invention to provide an assembly that looks and sounds like a functional supercharger blower for a motor vehicle but does not function to produce the added horsepower produces by functioning units.

DETAILED DESCRIPTION OF THE PREFERRED EMBODIMENTS

Figure 1:
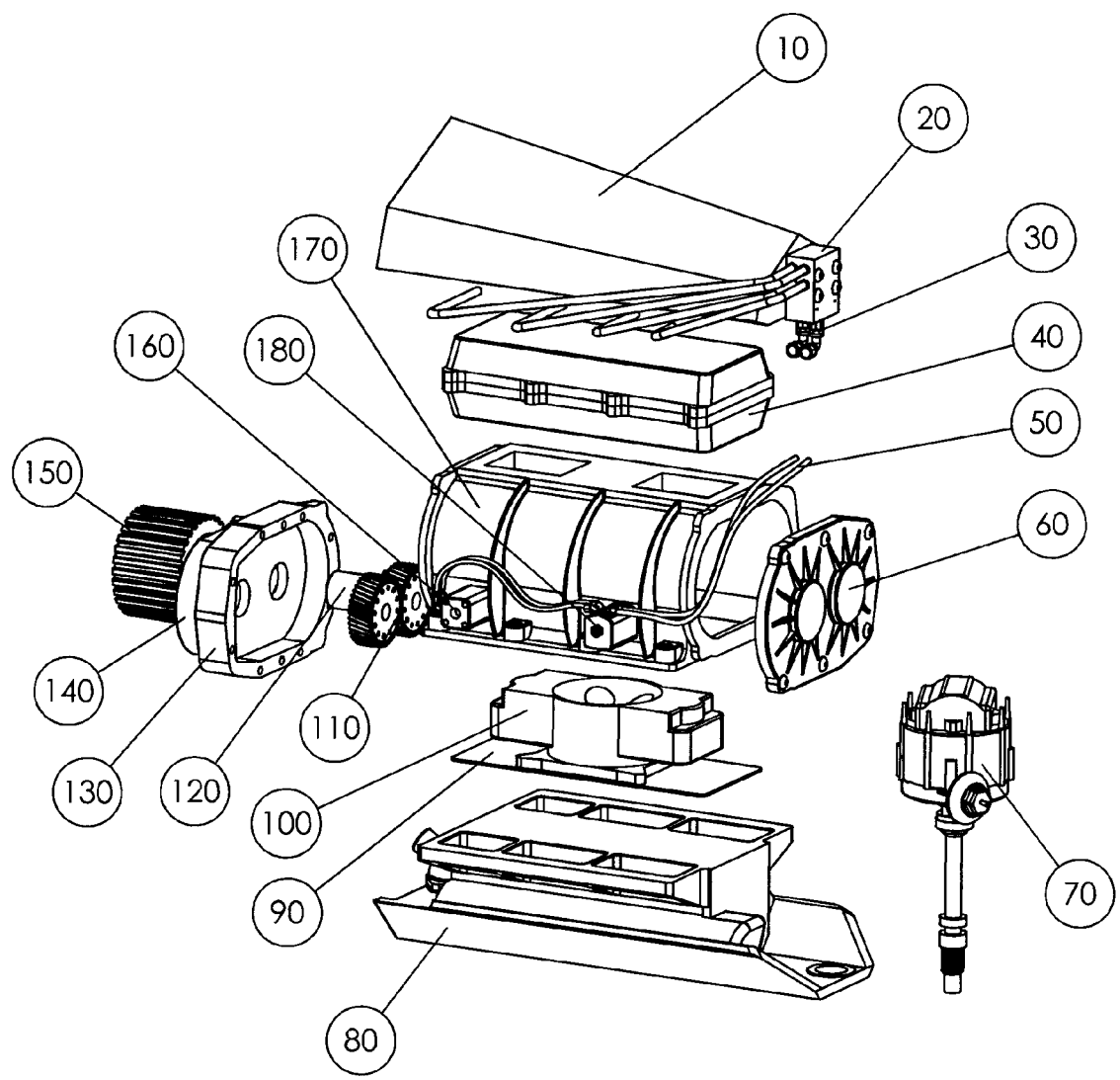
FIG. 1 is a schematic depiction of the separated component parts of the present invention.
Figure 2:
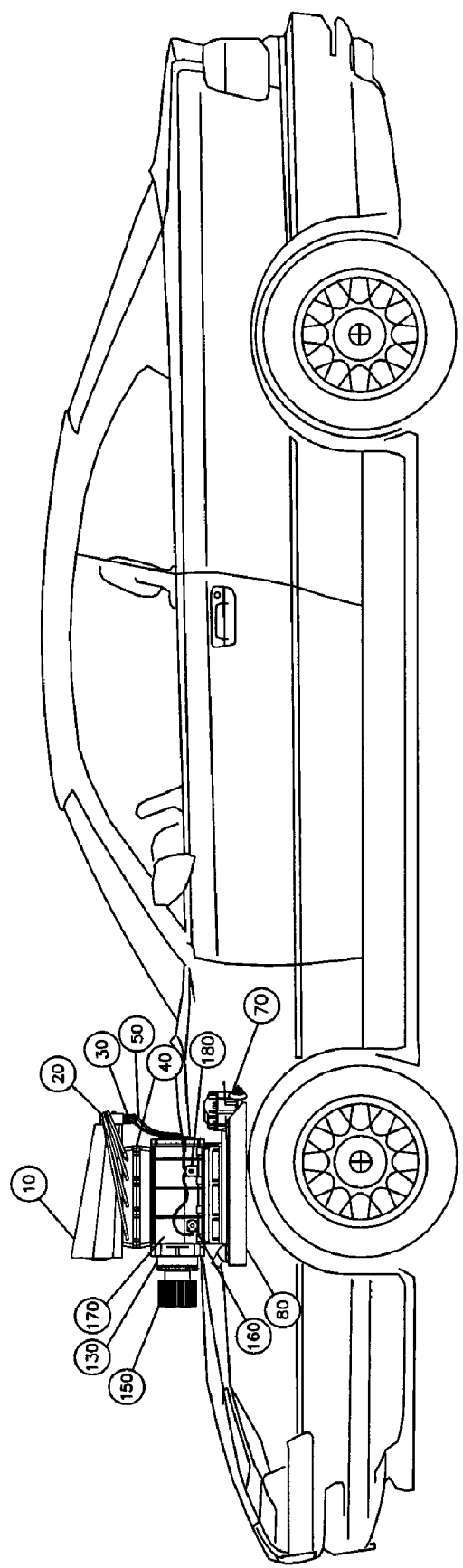
FIG. 2 shows a side view of a car with the imitation supercharger mounted in a position of use.
Figure 3:
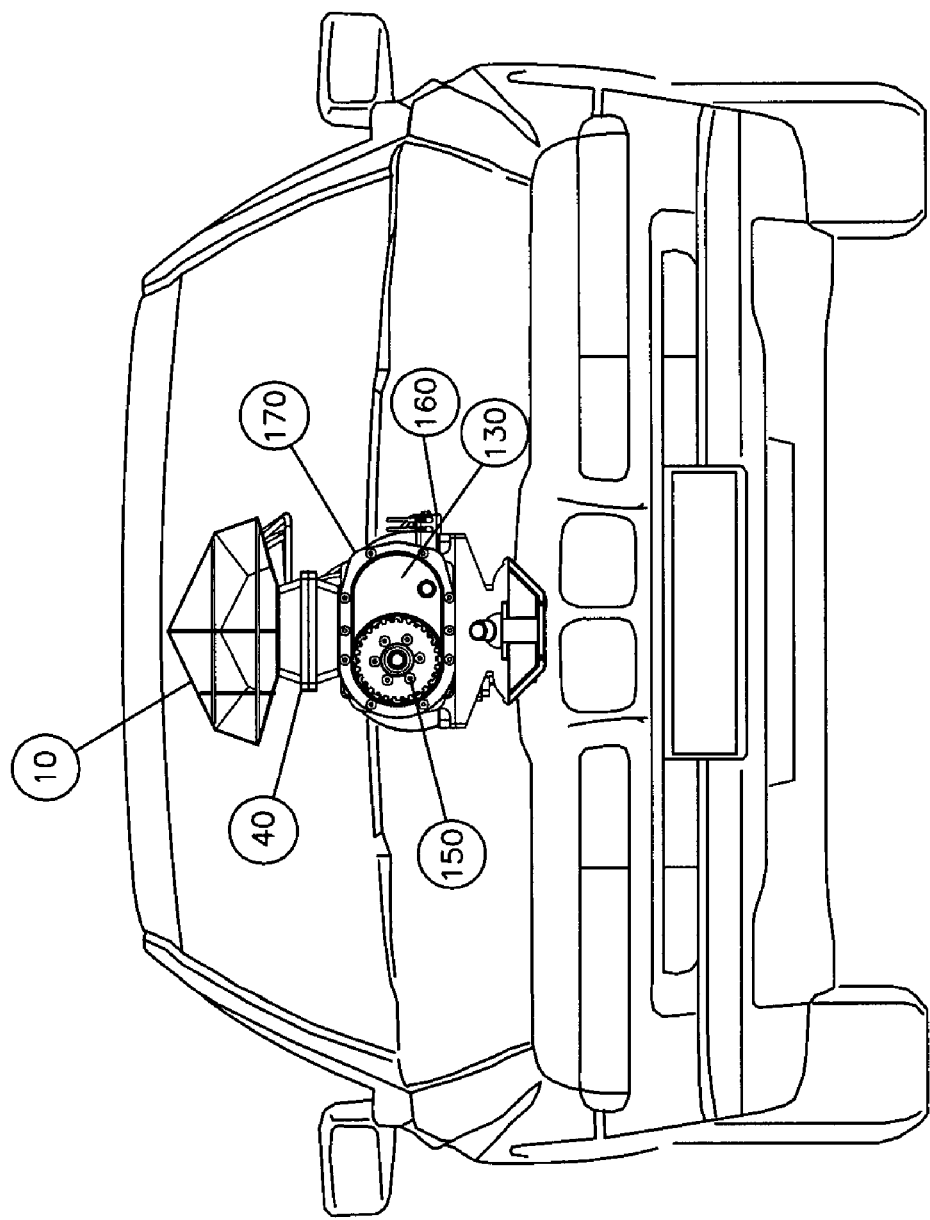
FIG. 3 shows a front view of a car with the imitation supercharger mounted in a position of use.

The present assembly provides for an air intake scoop, or manifold that comprises a non-functioning fuel block and non-functioning fuel injection lines. Functional supercharger blowers require manual priming of the fuel lines and connection of fuel lines to the motor vehicle fuel system. The manual priming and connection complexities are eliminated by the present invention.

The blower assembly comprises a manifold or air scoop 10 which protrudes through an opening formed in the hood of a motor vehicle as is commonly known. The manifold 10 further comprises non-functioning fuel injection lines 30 and non-functioning fuel block 20 mounted on the closed end of manifold 10. The manifold 10 is mounted, by any acceptable means as is commonly known in the art, on a non-functioning fuel injection nozzle spacer 40. Those skilled in the art are familiar with various ways and methods engine parts are connected. A preferred connection provides for the components of the present invention to be secured to one another by nuts and bolts along the outer periphery of the components to be joined. The manifold 10 and spacer 40 further are connected to a blower case 170, by any acceptable method as discussed above. The blower case 170 has, mounted on one side, functioning carburetor throttle linkage 180 and a functioning carburetor fuel line 160 because it is contemplated that in a preferred environment of use, the blower case 170 rests on top of an existing carburetor 100 and carburetor plate 90 located on the upper portion of an engine 80. One end of the blower case 170 has a bearing housing 130 that encloses at least two drive gears 110 that are connected to a drive pulley 150 mounted on the exterior of the bearing housing 130. The drive gears 110 interact with a drive pulley 150 when the drive pulley 150 is turned and subsequently turns drive coupler 120 that interacts through bearing housing 130 through an orifice that allows for the drive pulley 150 to turn drive coupler 120 that ultimately turns gears 110. The bearing housing 130 has front cover 140 that holds drive pulley 150 and has internally located drive gears 110 and externally located drive pulley 150 are placed at one end of the assembly and are configured such that the drive pulley 150 can be connected to the engine crankshaft pulley by a belt, or other appropriate interacting device as is known in the art. The placement of the drive gears 110 and drive pulley 150 provide that when a crankshaft pulley turns a belt, or other appropriate interacting device connected to the drive pulley, it turns the drive pulley which turns the connected drive gears of the assembly to produce a sound similar to functioning supercharger blower systems. Blower case 170 is further mounted above carburetor 110 and carburetor plate 100 onto intake manifold 90. Blower case 170 also has a rear cover 60. Mounting may be by an appropriate means as is known in the art.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A method for providing the look and sound of a supercharger blower assembly, said supercharger blower assembly comprising;

(a) an intake manifold;

(b) a spacer for receiving attachment of said intake manifold;

(c) a blower case configured for connectively receiving said manifold attached to said spacer;

(d) a bearing housing secured to one end of said blower case;

(e) a drive pulley attached to the exterior of said housing; and (f) at least two gears within said bearing housing interacting with said blower pulley; said gears are configured to be turned by connective interaction between an engine drive train and said drive pulley wherein the turning of said gears produces a sound similar to a functioning blower; further wherein said supercharger blower assembly is an imitation supercharger blower assembly and does not interact with air intake of an engine; the method comprising the steps of:
(a) mounting an imitation supercharger blower assembly to the engine of a motor vehicle;
(b) attaching drive gears of said imitation supercharger blower assembly to a belt connected to drive train of said motor vehicle; and
(c) activating said imitation supercharger blower assembly by initiating engine ignition of said motor vehicle.

2. An imitation supercharger blower assembly comprising:
(a) an intake manifold
(b) a spacer for receiving attachment of said intake manifold;
(c) a blower case configured for connectively receiving said manifold attached to said spacer;
(d) a bearing housing secured to one end of said blower case;
(e) a drive pulley attached to the exterior of said bearing housing; and
(f) at least two gears within said bearing housing interacting with said blower pulley; said gears are configured to be turned by connective interaction between an engine drive train and said drive pulley wherein the turning of said gears produces a sound similar to a functioning blower; further wherein said supercharger blower assembly is the imitation supercharger blower assembly and does not interact with air intake of an engine in which said imitation supercharger blower assembly is mounted.

3. The imitation supercharger blower assembly of claim 2 wherein said intake manifold extends above the upper outer surface of a motor vehicle engine hood.

4. The imitation supercharger blower assembly of claim 2 wherein rotors are not present.

5. The imitation supercharger blower assembly of claim 2 wherein said assembly is configured to directly to an HEI distributor without the need of additional adapters.

6. The imitation supercharger blower assembly of claim 2 wherein said intake manifold extends through and above a hood of a vehicle.

7. The imitation supercharger blower assembly of claim 2 wherein said bearing housing encloses said bearing plate.

8. The imitation supercharger blower assembly of claim 2 wherein said bearing housing encloses said gears.

9. The imitation supercharger blower assembly of claim 2 wherein the turning of said gears produces a sound similar to a functioning blower.

10. The imitation supercharger blower assembly of claim 2 wherein said sound is between 50-90 db when measured within five feet of the assembly.

11. The imitation supercharger blower assembly of claim 2 wherein said assembly further comprises non-functioning fuel components selected from the group of fuel injector lines, fuel regulator, fuel pressure activator, and fuel block.

* * * * *